Patented Apr. 22, 1924.

1,491,652

UNITED STATES PATENT OFFICE.

WILLIAM G. ALLEN, OF SALEM, OREGON.

PRESERVING FOOD PRODUCTS FOR CANNING.

No Drawing. Application filed February 8, 1922. Serial No. 535,052.

*To all whom it may concern:*

Be it known that I, WILLIAM G. ALLEN, a citizen of the United States, residing at Salem, in the county of Marion and State of Oregon, have invented certain new and useful Improvements in Preserving Food Products for Canning, of which the following is a specification.

The present invention relates to the art of packing or canning of fruits, and in particular to a novel process of treating certain kinds of fruits, such as apples, which it has been long since demonstrated require special treatment to enable packing with any degree of success.

At least two important conditions are encountered in the carrying out of the known processes of handling this product; first, the readiness with which the fruit oxidizes or becomes discolored and disintegrates or breaks up when subjected to the usual methods of heat treatment; second, the tendency of the containers to puff up owing to the generation of a certain amount of gas therein, producing what is known as "swells," followed by pin-holing of the cans owing to the presence of oxygen in the head space, which oxygen will cause certain parts of the apple to turn dark.

Each of these difficulties has been met in one way or another by resorting to preventative measures, but the results have been anything but satisfactory in so far as appearance and economy of pack are concerned. That is to say, to preserve the color, the fruit is customarily treated with salt or subjected to blanching. Perhaps the greatest step in advance towards solution of these problems resulted from the practice of vacuumizing the apples prior to subjecting them to the usual processing, and reference is here made in this connection to the process disclosed in the patent to Sellars, No. 1,279,379, dated September 17, 1918, as exemplary of this treatment. In this patent, as well as in the process of my co-pending application, Serial No. 514,957, filed November 14, 1921, the fruit is first enclosed in a vacuum chamber while immersed in the preserving liquid, and the air withdrawn from the cells of the fruit through the liquid, after which the vacuum is released so that the air is replaced by the liquid, the fruit being in the permanent containers or subsequently filled thereinto. Such treatment of fruits in general possesses great advantages which need not be here enumerated, it sufficing to say, however, that as applied to apples there exists an important defect which it has been my aim to overcome by these improvements.

In so far as the packing of apples is concerned, the Sellars patent is no longer practiced and this for the one reason that it is impossible to get the proper amount of fruit in the can. The ordinary No. 10 can, into which practically all of the apples are packed, will hold only about 4¼ lbs. to 4½ lbs., net of prepared apples. If these apples are vacuumized, they will take on in weight from twenty to twenty-five per cent, by reason of replacing the air naturally in the fruit cells with preserving liquid, and this is about the percentage of air in the apple, by volume. The vacuumizing process tends to harden the cell walls of the fruit and prevents the pieces of apples from settling close together and thus makes it impossible to get as heavy a drained weight of apples as is desired.

By my process I eliminate this excess or surplus liquid so as to permit the packing of a very much greater quantity of solid fruit in the containers, but in addition to this the quality and appearance are greatly improved, because advantage is taken of the support imparted by the liquid which remains after treatment in replacement of the air in the cells of the fruit which prevents the breaking up of the pieces of apples as heretofore experienced. In other words, it has been long customary to blanch apples in the canning process, always with the resultant disintegration, and it is not new as heretofore explained to vacuumize the fruit, attended by both partial disintegration and material reduction in the quantity that can be packed in the containers, so that my discovery resides broadly in the proper application of these two steps so that the one permits of the use of the other in the production of a superior result and product in the art of preserving.

To this end, instead of subjecting the fruit to either one of these steps alone, as heretofore practiced, my invention contemplates the order of first vacuumizing and then blanching, it being at the same time indicated that to reverse this order brings about a defeat of the ultimate result desired.

To be more specific, in the carrying out of my process I first prepare the apples in the customary manner and introduce them into a vacuum chamber, as done in the process of my copending application, the apples being immersed in the preserving liquid, preferably only so much liquid being employed as the apples will be capable of absorbing. The air is now withdrawn from the chamber and from the fruit through the liquid by suitable vacuumizing means, thus causing the product to swell to a certain extent without rupturing the walls of the fruit cells. The vacuous condition is then released and atmospheric pressure admitted into the chamber, resulting in the impregnation of the fruit by the liquid in replacement of the air formerly contained in the cells, so that the apples have the appearance of being waterlogged, their cells expanded to the fullest extent with the water therein. Obviously to pack the apples in this state would prevent the pieces of the fruit from settling close together and thus it would be impossible to get anything like the quantity of apples in the can that is essentially necessary, which is the reason why the process of the Sellars patent has proven to be impractical in actual practice. However, by so vacuumizing, all of the free oxygen is driven out of the apples and they will not oxidize or discolor. Furthermore, such treatment has the action of "firming up" the walls of the fruit to enable it to withstand the subsequent treatment to which the apples are now subjected. I now pass the fruit into a blanching chamber or conduit containing either steam or hot water, the heat from which causes the apples to give off substantially all of the water taken up during the vacuumizing process, which water, however, during the blanching period, acts to support the cell walls to the extent of preventing breaking down of the fibres as above suggested. Since the apples are still free from air and have now lost their excess liquid, and the pieces having been softened by heat, they can be filled into the containers as the next step, the precaution of completely filling the respective receptacles being observed, so that no free air space will remain in the cans. Substantially no shrinkage can occur and therefore the container will be free from the tendency to pin-hole, and the processing to which it is then subjected after sealing, of course, is more rapid and thorough, since the air which usually prevents the penetration of the heat throughout the contents is completely removed.

I find that fruit which has been treated in this manner is greatly improved, clear and uniform, regardless of the ripeness or the variety thereof, so that a much superior product is obtained than is possible when the known processes are employed for the preserving of this type of food product.

Having thus described my invention, what I claim as new and desire to secure by Letters Patent is:

1. The process of preserving apples which consists in withdrawing the air from the apples, impregnating them with preserving liquid, and then subjecting them to heat to drive off excess liquid.

2. The process of preserving apples which consists of withdrawing air from the apples while in a liquid, causing said liquid to pass into the cells of the apples, and then heating the impregnated product to drive off the surplus liquid.

3. The process of preserving apples and the like which consists in subjecting the apples to a vacuum while in a predetermined quantity of liquid sufficient only to be absorbed by the apples, releasing the vacuum to force the liquid into the pores of the apples, and finally blanching the apples by heat to drive off the surplus liquid.

4. The process of canning apples which consists of vacuumizing the apples while in a liquid to substantially extract all free oxygen, then blanching the apples to drive off the liquid absorbed thereby during the vacuumizing process, and finally completely filling the cans so that no air space is left therein.

5. The process of canning apples which consists in introducing the apples into a vacuum chamber containing a preserving liquid to withdraw the free oxygen therefrom, releasing the vacuous condition to force the liquid into the cells of the pores, then introducing the impregnated product into a heating chamber to drive off the surplus liquid, and thereupon completely filling and sealing the receptacles for final processing.

In testimony whereof I affix my signature.

WILLIAM G. ALLEN.